Dec. 29, 1964    E. M. WISHING    3,163,085
ARTICLE END CUTTING MACHINE

Filed July 25, 1962    6 Sheets-Sheet 6

INVENTOR.
EUGENE M. WISHING
BY
OSTROLENK, FABER, GERB & SOFFEN
ATTORNEYS

United States Patent Office 3,163,085
Patented Dec. 29, 1964

3,163,085
ARTICLE END CUTTING MACHINE
Eugene M. Wishing, Elkins Park, Pa., assignor to I-T-E Circuit Breaker Company, Philadelphia, Pa., a corporation of Pennsylvania
Filed July 25, 1962, Ser. No. 212,266
11 Claims. (Cl. 90—17)

My invention relates to a machine to cut radii in the intersecting portion of a member which is to mate with a circular member such as a tube, at the angle of intersections in infinite amounts, angles and lengths, and more particularly to such a machine incorporating a number of independent angular adjustments of a cutting edge relative to the tube in-feed.

In many areas of mechanical fabrication, it is necessary to cut the ends of a structural member, such as a tube, to appropriately mate with the circumference of a similar intersecting member. One example of this is the fabrication of tubular aluminum furniture, wherein the various structural members comprising the assembled product meet at various angles of intersection. The ends of such tubes must be appropriately cut to closely mate with their intersecting member at the requisite angle of intersection.

Another typical example is the fabrication of antennas wherein the antenna backing structure is formed of an appropriately interconnected array of tubular elements forming the desired antenna concavity. The individual tubes which comprise the array must have their ends appropriately contoured to mate in accordance with both the simple and compound angles of intersection experienced in practice.

One method of cutting the tube ends presently practiced is to shear by a punch and die setup. Inasmuch as a separate punch and die set is required for each angle cut and each radius desired, this method becomes quite costly for variable angle cuts, and requires excessive setup and production costs.

Another method of the prior art is to saw the end in accordance with the desired cut configuration. This method suffers from limited accuracy, thereby resulting in poor joining conditions which in turn cause such problems as distortion, excessive shrinkage, and excessive requirements of welding time and materials.

Another method presently being practiced is to utilize a standard milling machine to obtain the tube end cuts. This method suffers from very excessive setup costs due to the limited versatility of standard machines, is limited to narrow adjustability as to the desired angle cuts, and has demonstrated poor repeatability, high production costs and high scrap factor.

My invention avoids the above-discussed disadvantages of the prior art by arranging a standard milling machine head and the work in-feed in a manner permitting angular adjustment of their relative positions. The milling machine cutter has a diameter corresponding to the intersecting member of the tube being cut. By positioning the milling machine cutter with respect to the tube at its ultimate angle of intersection, a cut will be made in the tube which will mate with a tube at a corresponding angular intersection. The milling machine head is angularly adjustable to vary its intersection within the tube end. The tube feed table is independently angularly adjustable to similarly vary the intersection angle. The combination of the two angular movements (cutter head and feeding table) yields an infinite number of angles, both simple and compound, between the tube end and the cutter.

As an additional aspect of my invention, the opposite end of the tube may be similarly cut with the relative orientation of the tube ends being adjustable about the tube axis. That is, the first end is placed against a mating rear stop which may be rotated about the longitudinal axis of the tube to yield the desired angular relationship between the cuts at the opposite tube ends.

As another aspect of my invention, the feeding of the tube to and from the cutter is done automatically. To maintain constant depth of cut at various angles of setup, it is essential that the tube be positioned the same distance from the cutter for all cuts. I provide this by including additional degrees of movement in the cutter head support to maintain this distance at large angles of inclination.

As a further aspect of my invention the rear tube stop of the feeding table is angularly adjustable within the horizontal plane of the table to permit the use of my machine with curved tubing. Also, the rear stop may be located on an extension member to adapt the machine to tube lengths in excess of the table size.

As still another aspect of my invention, the feed table may be appropriately modified in accordance with different diameters of tube, to maintain the requisite orientation between the center line of the tube and the cutter.

It is therefore seen that the basic concept of my invention resides in providing means for the angular adjustment of the tube to be cut with respect to the cutting edge, to correspond to the intersection angle of that end to its mating tube. The cutter head and feed table are independently adjustable about their axis, the combination of the two angular movements providing a desired infinite number of simple and compound angles to the tube end.

It is therefore a primary object of this invention to provide a tube end cutting machine for the efficient production of angular cuts, with a high degree of reproducibility.

Another object of this invention is to provide a tube end cutting machine for rapidly imparting a simple or compound cut in the end of the tube to correspond to the intersection angle of that tube with respect to a mating tube.

An additional object of this invention is to provide a machine for angularly cutting the ends of an elongated tube and having provision for changing the angular cut with a minimum of time, effort and expense.

A further object of this invention is to provide such a tube end cutting machine which may readily be adjusted to operate in conjunction with a variety of tube diameters.

Still another object of this invention is to provide an article end cutting machine wherein the cutting element and the feed table are independently angularly adjustable to provide a plurality of simple and compound cuts.

Still an additional object of this invention is to provide such a tube end cutting machine, including positioning means for angularly locating the opposite ends of the tube about its longitudinal axis.

Still a further object of this invention is to provide such a tube end preparation machine including an automatic feed, and including cutter and feed positioning means to maintain the depth of cut.

Yet an additional object of this invention is to provide a tube end cutting machine, wherein the tube is fastened to an in-feed table angularly adjustable about a first axis, and the cutting element is independently angularly adjustable about another axis, thereby establishing a plurality of simple or compound angular relationships between the tube end and the cutting element.

These as well as other objects of my invention will readily become apparent after reading the following descriptions of the accompanying drawings in which.

Figures 1, 2, 3:
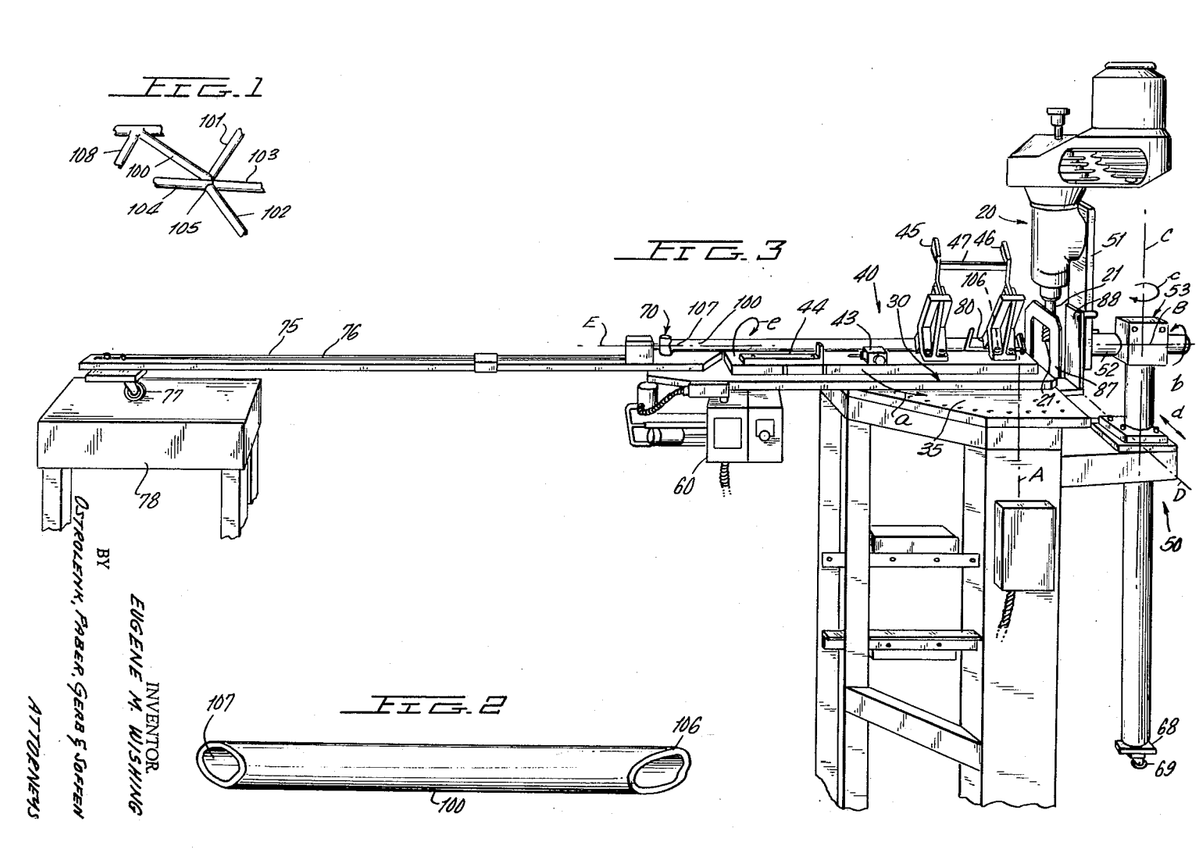
FIGURE 1 is a perspective view typically illustrating the intersection of a plurality of tubes which may be appropriately cut with the machine of my invention.
FIGURE 2 is a perspective view of one of the tubes shown in FIGURE 1, illustrating the type of cut which is to be imparted to the tube end.
FIGURE 3 is an overall perspective view illustrating a preferred embodiment of my invention, with the cutting head and the feed table shown adjusted for a simple 90° cut.

Reference is initially made to FIGURE 1 which illustrates a typical structure fabricated in an improved manner by the use of my invention. Tubes 100–104 intersect at common point 105. Their intersecting ends must be cut to appropriately mate. That is, inasmuch as the tubes meet at various angles of intersection, the ends have to be cut at corresponding angles. FIGURE 2 shows one of the intersecting tubes 100 having its end 106 cut to correspond to the angle of intersection with tube 104, and its other end 107 cut in accordance with the angle of intersection with tube 108.

The assembly of tubes shown in FIGURE 1 may typically be a portion of the backing structure of an antenna. It is quite apparent that inasmuch as the variety of tubes comprising the overall antenna would be intersecting at an infinite number of simple and compound angles, the efficient quantity production of such antenna systems would necessitate a machine tool capable of accurately cutting the mating tube ends. Such a machine tool must preferably be designed to be easily and rapidly adjustable to correspond to the variety of setups typically encountered in the production of such antenna structures.

Figure 4:
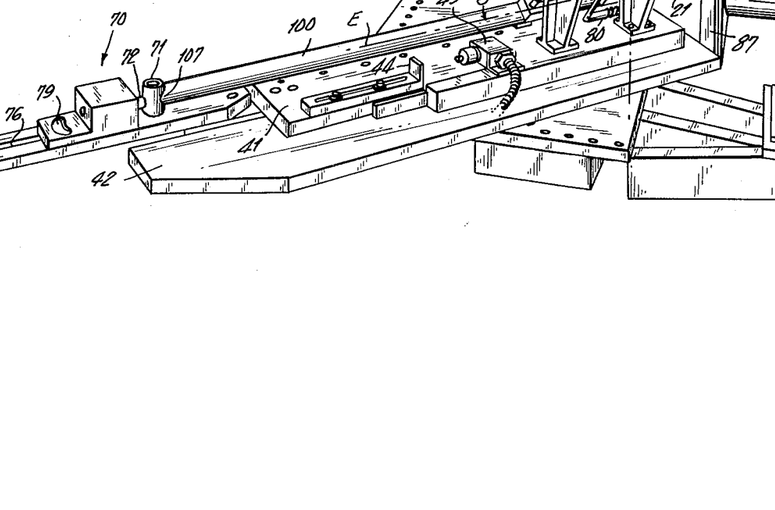
FIGURE 4 is another perspective view of the machine of FIGURE 3, shown adjusted for a compound cut.

A preferred embodiment of such a machine tool, which is the subject of the instant invention, is shown in perspective form in FIGURES 3 and 4. Tube 100, which may typically be a length of aluminum tubing is clamped to in-feed table 40 and angularly positioned with respect to cutter 20 to correspond to the desired angular cut of tube end 106. Cutter 20 may be a standard milling attachment cutting head appropriately supported, as will be subsequently set forth, to provide the requisite angular relationship between cutting element 21 and tube end 106. Cutting element 21 conforms to the diameter of the tube to which end 106 is to mate (as, for example, tube 101 of FIGURE 1).

In-feed table 40 is appropriately interconnected to platform support 30 (as will be subsequently set forth) to permit angular adjustment of in-feed table 40 about vertical axis A, as shown by arrow $a$. To provide a second degree of adjustment, cutting head 20 is appropriately interconnected to support assembly 50, as will be subsequently set forth, to permit angular adjustment about horizontal axis B, as shown by arrow $b$. The combined angular movement of in-feed table 40 about axis A, and cutting head 20 about axis B, will establish an infinite number of simple or compound angular relationships between cutting element 21 and tube end 106.

As an additional feature of my invention, end 106 is automatically fed to cutting element 21 by a feed means generally shown as 60. Feed 60 may typically be a transformer-controlled dual-speed air feed, having a rapid in-feed for a predetermined distance, and then switching to slow in-feed during the engagement of tube end 106 and cutter 21. To reproduce a uniform depth of cut, it is desirable that tube end 106 be positioned the same distance from cutting element 21 for all relative angular positions. It has been found that this relationship may best be maintained for angle of intersection in excess of 45° by providing additional degrees of movement of cutting head 20 within its support assembly 50. That is, cutting head 20 is angularly adjustable about vertical axis C, as shown by small arrow $c$, and longitudinally adjustable along horizontal axis D, as shown by small arrow $d$.

As another feature of my invention rear end 107 of tube 100 is positioned against stop 70. Stop 70 is angularly adjustable about tube axis E, as shown by arrow $e$, to provide the requisite angular relationship between the cuts of opposite tube ends 106 and 107. Also, the location of stop 107 within the horizontal plane of the feed table 40 is adjustable to accommodate tubes of various lengths and curvatures.

FIGURE 4 illustrates the adjustment permitted by my invention to provide a compound cut of tube end 107. In-feed table 40 has been angularly adjusted about axis A an amount equal to $\theta$. Concurrently and independently, cutter 20 has been angularly adjusted about axis B from the vertical position shown in FIGURE 3 an amount equal to $\phi$. Appropriate adjustments have also been made of cutter 20 along axis D and about axis C to maintain the distance of the tube end 106 from cutting element 21. Thus, tube end 106 will be compound cut a uniform depth in accordance with the combined effects of angles $\theta$ and $\phi$.

In-feed table 40 contains a slide member 41 and a stationary member 42. Stationary member 42 includes a retract sensing device 43, which may typically be a microswitch, activated by adjustable abutment 44 carried by slide 41. Switch 43 signals when the desired depth of cut has been achieved, and thereby automatically retracts slide 41. Tube 100 is clamped to slide 41 by individual clamps 45, 46 which are designed, as will be subsequently set forth, to maintain the appropriate positioning of the center line of tube 100 with respect to cutting element 21. Clamps 45, 46 may be connected by a bar 47 for simultaneous operation.

Figure 5:
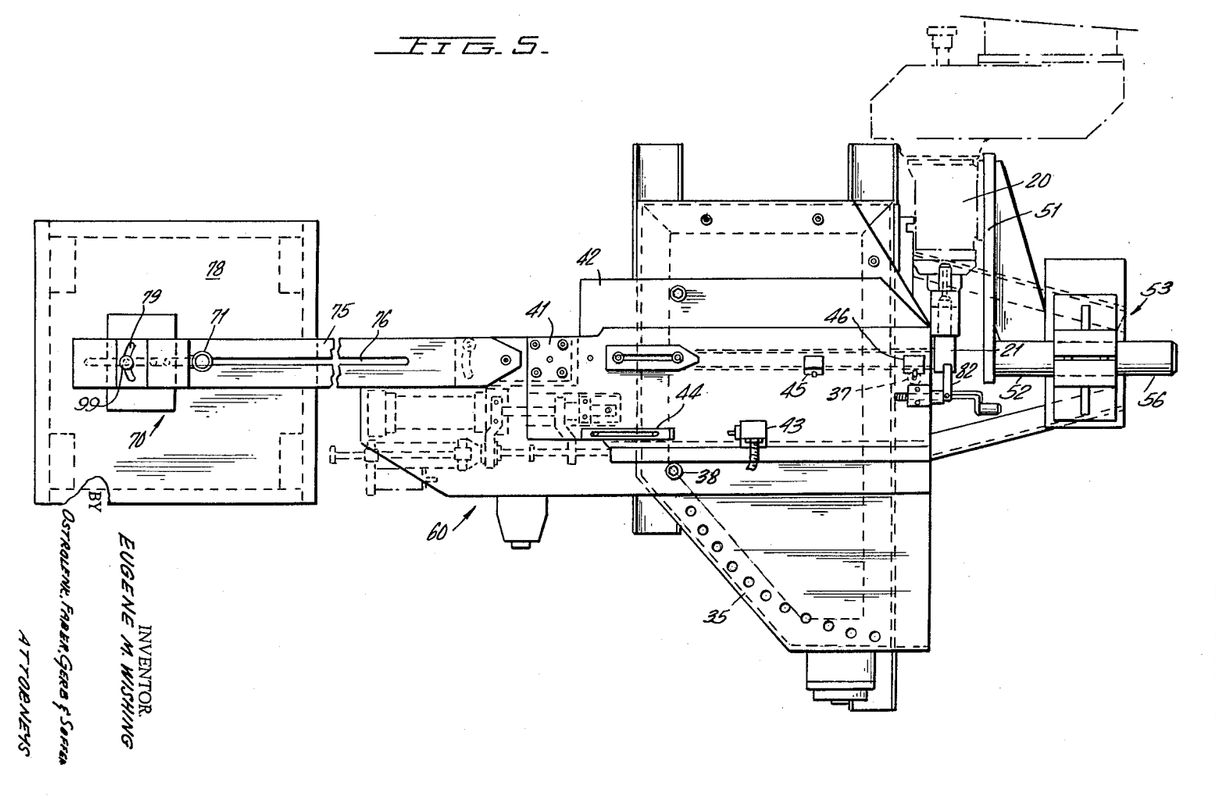
FIGURES 5 and 6 are plan and elevation views respectively of the tube end preparation machine of FIGURES 3 and 4, with the table adjusted as shown in FIGURE 1, and the cutter shown rotated to the 90° position.
Figure 6:
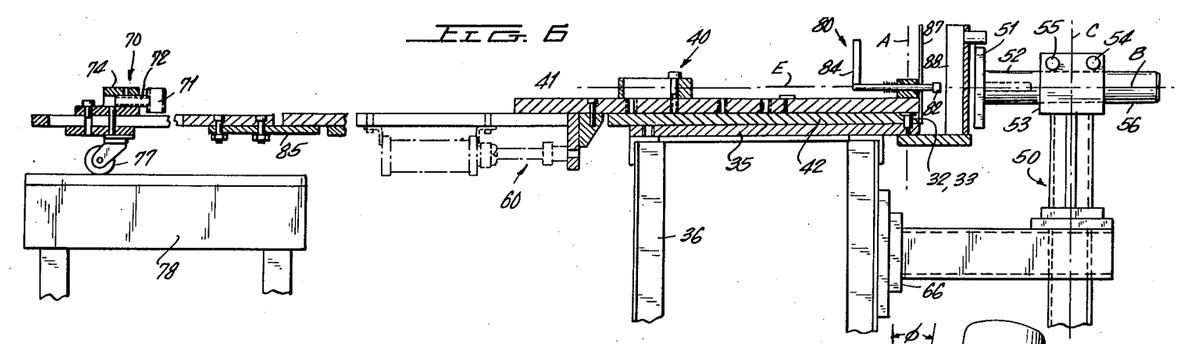
Figures 9, 12:
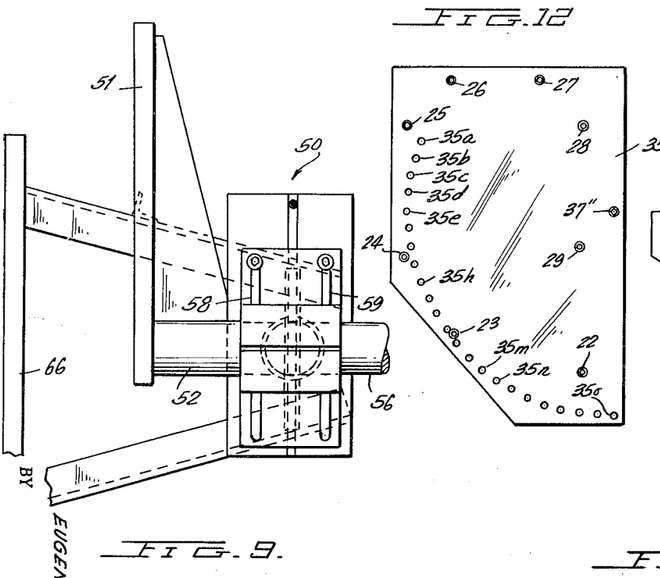
FIGURE 12 is a plan view of a jig plate which may be used to provide angular positioning of the feed table, in accordance with the teachings of my invention.
Figure 13:
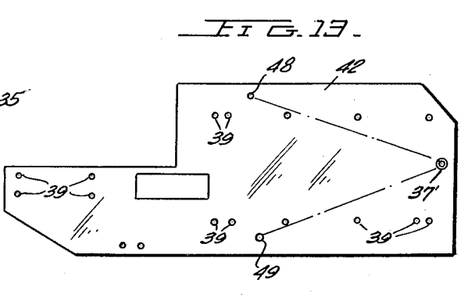
FIGURE 13 is a plan view of one of the members of the feed table adapted to be rotatively positioned about the jig plate of FIGURE 12.

Reference is now made to FIGURES 3 and 4, in conjunction with FIGURES 12 and 13, to show the angular adjustment of feed slide 40 within its horizontal plane about vertical axis A. Jig plate 35 is secured as bolting through apertures 22–29 to support table 36. Table 36 typically may be constructed of steel structural members. In-feed table 42 pivots about point 37 (as shown in FIGURE 5) by the appropriate pivotal interconnection of members 35 and 42 through apertures 37', 37'' (as shown in FIGURES 12 and 13), such as by shoulder screw 32 in a commercially available threaded insert 33; the threaded insert member 33 preferably being used to avoid excessive wear or wobble at the pivotal engagement point. In-feed table 42 includes aperture openings 48, 49 radially equi-distant from pivot point 37'. Jig plate 35 includes a plurality of tapped apertures 35a–35w similarly radially equi-distant from pivot point 37''. The apertures contained in jig plate 35 may be typically spaced in 5° center-to-center spacing, preferably drilled with a non-accumulative tolerance. It is now apparent that angular adjustment of in-feed table 42 about axis A is provided by relative rotation of members 42 and 35 about pivot point 37. The relative angular location may be fixed in stepped intervals, as for example 5°, by the bolting of in-feed table 42 to jig plate 35 through apertures 48, 49 and into the respective ones of apertures 35a–35w. In a typical illustrative embodiment apertures 48, 49 were separated by 40° and connected by a machine screw 38 entering the respective openings of jig plate 35. In-feed table 42 contains a number of apertures, generally shown as 39, positioned to receive slide member 41.

Figure 7:
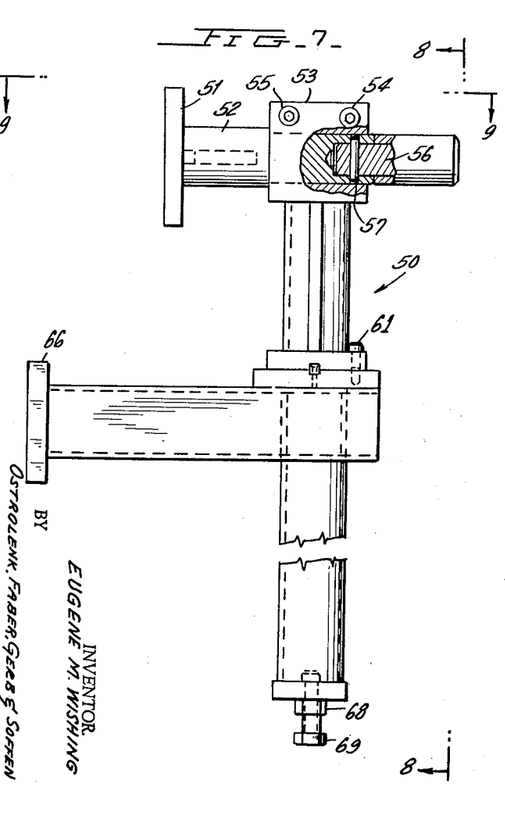
FIGURES 7, 8 and 9 are elevation, end and plan views respectively of the cutter support assembly.
Figure 8:
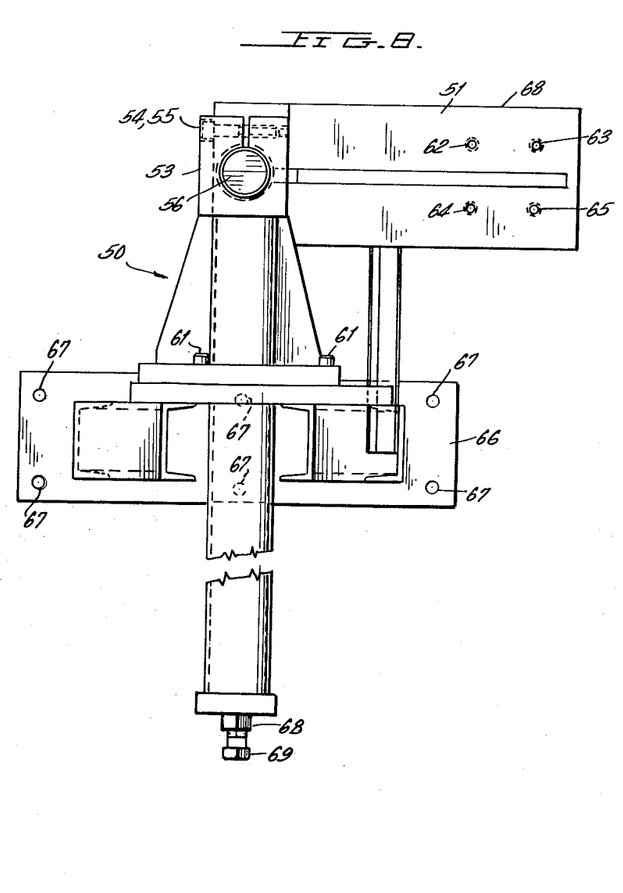

The manner in which cutting head 20 rotates about axis B may best be seen by referring to FIGURES 7–9. Cutting head 20 is approximately attached to support plate 51 of head support assembly 50, as by tapped holes 62–65 spaced to engage the housing of standard milling machine head 20. Support plate 51 is connected to shaft 52 which is rotatively positioned within split housing 53, adapted to be tightened by bolts 54, 55. Hence, the loosening of bolts 54, 55 and the angular rotation of shaft 52 within housing 53 provides the afore-described angular adjustment of cutting head 20 about axis B.

Rotation about axis C, to maintain the distance between tube end 106 and cutting element 21, is provided by the rotation of shaft 52, by the loosening of slip-fit shaft 52 at bolts 54 and 55 and then rotation of the shaft about axis C. Shaft 52 may be extended by a shaft extension 56 secured thereto, as by press fit dowel 57, to provide increased adjustment of the cutter head with respect to axes B, C, D, in a manner minimizing vibration of the cutting head. The longitudinal movement along axis D is provided by a key slot arrangement including slots 58, 59 and bolts 61.

The central portion of cutter assembly 50 includes plate 66 appropriately dimensioned and containing apertures 67 to interconnect to feed support table 36. Cutting head assembly 50 may be height adjusted relative to plate 66 by the loosening of bolts 61. The lowermost end of the cutting head assembly includes a height adjustable foot 68, 69 (shown comprising a threaded member 69 in nut 68), so as to engage the floor (as shown in FIG. 3) for supporting the cutting head assembly 50.

Figure 10:
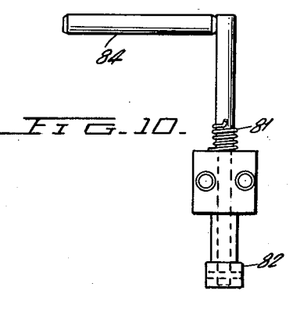
FIGURES 10 and 11 are plan and elevation views respectively of the front tube stop assembly used for initial setup of the work.
Figure 11:
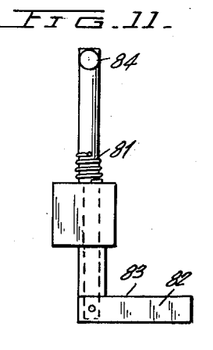

Front tube stop assembly 80 shown in FIGURES 10 and 11 is provided for initial adjustment of the first end cut of tube 100. Torsion spring 81 biases abutment member 82 away from engagement with tube 100. Front surface 83 of abutment member 81 is positioned to correspond to the center line of cutting element 21 (as best shown in FIGURE 5). Therefore, to properly position a tube 100 for the cutting of its first end, handle 84 of the tube stop assembly is manually rotated to position abutment member 82 in the path of tube 100. Tube 100 is then clamped to the feed table when in an abutting relationship with adjustment edge 83. The retract switch 43 and abutment 44 are then positioned for the desired depth of cut. The automatic feeding of tube 100 into cutter 21 will thereby be performed with reproducibility of cut depth, for all such tubes similarly positioned onto feed table 40.

Safety guide 87 is provided to prevent the operator from inadvertently moving his hand into the cutting element 21 after releasing handle 84 of tube stop assembly 80. Weldment assembly 88 is provided as a stop for edge 68 of cutter support plate 51 corresponding to a perpendicular relationship, as shown in FIGURE 3. Such a stop assembly preferably facilitates setup for the numerous simple angle tube cuts wherein head assembly 20 is to be positioned as shown in FIGURE 3.

Figure 14:
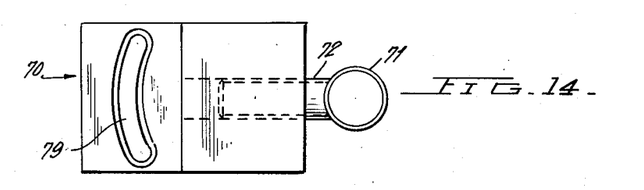
FIGURES 14 and 15 are plan and elevation views respectively of the rear stop assembly.
Figure 15:
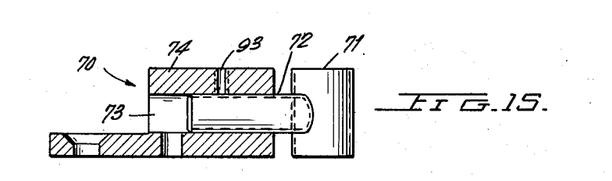

Rear tube backstop 70 includes a front portion 71 diametrically corresponding to the mating tube of end 107. Backstop 70 may be directly attached to slide 41 for relatively short tube lengths, or alternatively attached to an extension 75. Reference is made to FIGURES 14 and 15 which illustrate a typical interconnection of tube stop assembly 70 to its support housing. Shaft 72 of tube stop assembly 70 fits into elongated opening 73 of housing 74, and is rotatively positioned therein to provide the requisite angular orientation of surface 71 with respect to the tube end being cut. That is, the angular positioning of shaft 72 within housing 74 provides the desired angular relationship between the cuts at the opposite tube ends with respect to the longitudinal axis E of the tube. Set screw 93 transversely extending towards aperture 73 of housing 74 tightens shaft 72. Extension rod 75 to which housing 74 is secured contains an elongated slot 76 to permit location of assembly 70 corresponding to the length of the tube being cut. Wheel 77 at the end of extension 75 rests on table 78 to support the end of extension 75 and facilitate movement during in-feed slide translation.

Figure 16:
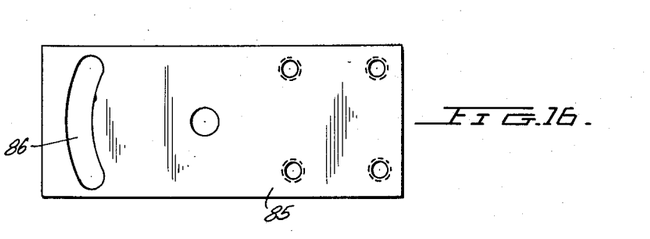
FIGURE 16 is a plan view of the rear extension connecting plate.

To permit the proper location of rear stop assembly 70 in accordance with the curve of a particular tube to be bent, housing 74 contains an arcuate slot 79 angularly adjustable as by socket head screw 99 about extension slot 76. Likewise, extension arm 76 is interconnected to the end of feed slide 41 by plate 85 shown in FIGURE 16, having a similar angular slot 86, to permit angular adjustment of extension arm 75, with respect to the end of feed slide 41.

Figure 17:
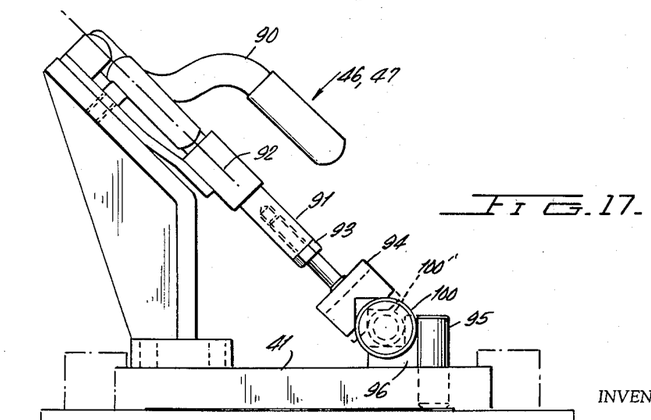
FIGURE 17 is a side view showing a preferable tube clamping arrangement which may be utilized in conjunction with my invention.

Reference is now made to FIGURE 17, which illustrates the preferred clamping arrangement of my invention. Clamps 45, 46 are preferably both of the same construction and inter-connected by bar 47 for simultaneous operation thereof. Each of the clamps contains a toggle arrangement 90 appropriately interconnected to shaft 91 to provide for longitudinal movement of said shaft along its axis 92. The lower end of shaft 91 is lengthwise adjustable by hex jam nut 93 to securably position end member 94 about the cross-section of tube 100. End 94 cooperates in conjunction with backstop 95 and spacer plates 96 to maintain the center line of tube cross-section 100 at the same location for all dimensions of tube within the capacity of the machine. For the largest cross-section of tube for which the machine is designed, the tube directly engages backing member 95 and the bottom surface of slide 41. Should a smaller diameter of tube be utilized, a spacer plate 96 of appropriate dimensions is connected at the angular intersection of backstop 95 and slide 41 to properly raise the cross-section of such a tube, such as 100' shown dotted for purposes of clarity, so that its center line is maintained in the same position.

It is thus seen that my invention provides a simplified apparatus for the production cutting of tube ends which are to angularly intersect another tube at an infinite number of simple and compound angles. An automatic feed and appropriate sensing and adjustment means are provided to maintain the depth of cut to a high degree of reproducibility.

It is naturally understood that various modifications may be made to the above-described embodiment without departing from the spirit and scope of the invention; as for example although described in conjunction with the cutting of tube ends, the feed and cutter may be appropriately modified to cut other articles to similarly intersect with curved surfaces. Also, the manner of supporting the cutting head and the feeding table to provide the requisite angular adjustment may be accomplished in a variety of alternative manners.

Since such variations and modifications will now become apparent to those skilled in the art, I prefer not to be limited to the specific disclosure herein, but only by the appended claims.

The embodiments of the invention in which an exclusive privilege or property is claimed are defined as follows:

1. An article cutting apparatus comprising a cutting means; feed means adapted to feed an article to be cut to engage said cutting means; said feed means being disposed in a first plane; said cutting means being disposed in a second plane intersecting said first plane; means adjusting the position of said feed means and said cutting means in their respective planes, and operatively related to vary the angular engagement of an article carried by said feed means and said cutting means; said feed means including an in-feed slide; means fastening an article to said in-feed slide; actuating means moving said in-feed slide towards said cutting means; first adjusting means angularly positioning said in-feed slide about a first axis; said first adjustment means varying the intersection angle of said cutting means and an article within said first plane; said actuating means constructed to automatically translate said in-feed slide a first predetermined distance; positioning means establishing a second predetermined distance between the article and said cutting means prior to translation of said in-feed slide; said actuating means operatively related to said in-feed slide and said positioning means to provide a uniform depth of cut in successive ones of said article being cut.

2. An article cutting apparatus comprising a cutting means; feed means adapted to feed an article to be cut to engage said cutting means; said feed means being disposed in a first plane; said cutting means being disposed in a second plane intersecting said first plane; means adjusting the position of said feed means and said cutting means in their respective planes, and operatively related to vary the angular engagement of an article carried by said feed means and said cutting means; said feed means including an in-feed slide; means fastening an article to said in-feed slide; actuating means moving said in-feed slide towards said cutting means; first adjusting means angularly positioning said in-feed slide about a first axis; said first adjustment means varying the intersection angle of said cutting means and an article within said first plane; said actuating means constructed to automatically translate said in-feed slide a first predetermined distance; positioning means establishing a second predetermined distance between the article and said cutting means prior to translation of said in-feed slide; said actuating means operatively related to said in-feed slide and said positioning means to provide a uniform depth of cut in successive ones of said article being cut; said positioning means including a third adjusting means provided in said support assembly; said third adjusting means angularly positioning said cutting means about a third axis, generally parallel to said first axis; the combination of said first and third adjusting means establishing the intersection angle of said cutting means and said article in said first plane.

3. An article cutting apparatus comprising a cutting means; feed means adapted to feed an article to be cut to engage said cutting means; said feed means being disposed in a first plane; said cutting means being disposed in a second plane intersecting said first plane; means adjusting the position of said feed means and said cutting means in their respective planes, and operatively related to vary the angular engagement of an article carried by said feed means and said cutting means; said feed means including an in-feed slide; means fastening an article to said in-feed slide; actuating means moving said in-feed slide towards said cutting means; first adjusting means angularly positioning said in-feed slide about a first axis; said first adjustment means varying the intersection angle of said cutting means and an article within said first plane; means fastening said cutting means to a support assembly; said support assembly including a second adjusting means angularly positioning said cutting means about a second axis; said second adjusting means varying the intersection angle of said cutting means and an article within said second plane, said first and second adjusting means separately operable to permit a plurality of simple or compound intersecting angles; a third adjusting means provided in said support assembly; fourth adjusting means positioning said cutting means along an axis generally parallel to said first plane, said third and fourth adjusting means maintaining said second pre-determined distance for intersection angles in said first plane in excess of 45 degrees.

4. A tube end cutting machine comprising a circular cutting means; feed means adapted to feed the first end of a tube into engagement with said cutting means, whereby a radius is cut in said first end of an angle corresponding to the intersection of said cutting means and said first end; means adjusting the angular relationship between said cutting means and said feeding means to vary the angular intersection of said first end and said cutting means; said feed means being disposed in a first plane; said cutting means being disposed in a second plane; said feed means including an in-feed slide; means fastening a tube to said in-feed slide; actuating means moving said in-feed slide towards said cutting means; first adjusting means angularly positioning said in-feed slide about a first axis; said first adjustment means varying the intersection angle of said cutting means and said first tube end within said first plane; said actuating means constructed to automatically translate said in-feed slide a first predetermined distance; positioning means establishing a second predetermined distance between said first tube end and said cutting means prior to translation of said in-feed slide; said actuating means operatively related to said in-feed slide and said positioning means to provide a uniform depth of cut in successive ones of said tubes being cut.

5. A tube end cutting machine comprising a circular cutting means; feed means adapted to feed the first end of a tube into engagement with said cutting means, whereby a radius is cut in said first end of an angle corresponding to the intersection of said cutting means and said first end; means adjusting the angular relationship between said cutting means and said feeding means to vary the angular intersection of said first end and said cutting means; said feed means being disposed in a first plane; said cutting means being disposed in a second plane; said feed means including an in-feed slide; means fastening a tube to said in-feed slide; actuating means moving said in-feed slide towards said cutting means; first adjusting means angularly positioning said in-feed slide about a first axis; said first adjustment means varying the intersection angle of said cutting means and said first tube end within said first plane; said actuating means constructed to automatically translate said in-feed slide a first predetermined distance; positioning means establishing a second predetermined distance between said first tube end and said cutting means prior to translation of said in-feed slide; said actuating means operatively related to said in-feed slide and said positioning means to provide a uniform depth of cut in successive ones of said tubes being cut; means fastening said cutting means to a support assembly; said support assembly including a second adjusting means angularly positioning said cutting means about a second axis, said second adjustment means varying the intersection angle of said cutting means and said first tube end within said second plane, said first and second adjusting means separately operable to permit a plurality of simple or compound intersecting angles, to be radially cut in said first tube end; said positioning means including a third adjusting means provided in said support assembly; said third adjusting means angularly positioning said cutting means about a third axis, generally parallel to said first axis; the combination of said first and third adjusting means establishing the intersection angle of said cutting means and said first tube end in said first plane.

6. A tube end cutting machine comprising a circular cutting means; feed means adapted to feed the first end of a tube into engagement with said cutting means, whereby a radius is cut in said first end of an angle corresponding to the intersection of said cutting means and said first end; means adjusting the angular relationship between said cutting means and said feeding means to vary the angular intersection of said first end and said cutting means; said feed means being disposed in a first plane; said cutting means being disposed in a second plane; said feed means including an in-feed slide; means fastening a tube to said in-feed slide; actuating means moving said in-feed slide towards said cutting means; first adjusting means angularly positioning said in-feed slide about a first axis; said first adjustment means varying the intersection angle of said cutting means and said first tube end within said first plane; said actuating means constructed to automatically translate said in-feed slide a first predetermined distance; positioning means establishing a second predetermined distance between said first tube end and said cutting means prior to translation of said in-feed slide; said actuating means operatively related to said in-feed slide and said positioning means to provide a uniform depth of cut in successive ones of said tubes being cut; means fastening said cutting means to a support assembly; said support assembly including a second adjusting means angularly positioning said cutting means about a second axis, said second adjustment means varying the intersection angle of said cutting means and said first tube end within said second plane, said first and second adjusting means separately operable to permit a plurality of simple or compound intersecting angles, to be radially cut in said first tube end; said positioning means including a third adjusting means provided in said support assembly; said third adjusting means angularly positioning said cutting means about a third axis, generally parallel to said first axis; the combination of said first and third adjusting means establishing the intersection angle of said cutting means and said first tube end in said first plane; fourth adjusting means positioning said cutting means along an axis generally parallel to said first plane, said third and fourth adjusting means maintaining said second predetermined distance for intersection angles in said first plane in excess of 45 degrees.

7. A tube end cutting machine comprising a circular cutting means; feed means adapted to feed the first end of a tube into engagement with said cutting means, whereby a radius is cut in said first end of an angle corresponding to the intersection of said cutting means and said first end; means adjusting the angular relationship between said cutting means and said feeding means to vary the angular intersection of said first end and said cutting means, a second end of said tube operatively engaging a rear stop; said rear stop rotatively positioning said first tube end about the longitudinal axis of said tube in a predetermined angular relationship with respect to a radius cut in said second tube end.

8. A tube end cutting machine comprising a circular cutting means; feed means adapted to feed the first end of a tube into engagement with said cutting means, whereby a radius is cut in said first end of an angle corresponding to the intersection of said cutting means and said first end; means adjusting the angular relationship between said cutting means and said feeding means to vary the angular intersection of said first end and said cutting means; said feed means being disposed in a first plane; said cutting means being disposed in a second plane; said feed means including an in-feed slide; means fastening a tube to said in-feed slide; actuating means moving said in-feed slide towards said cutting means; first adjusting means angularly positioning said in-feed slide about a first axis; said first adjustment means varying the intersection angle of said cutting means and said first tube end within said first plane; clamping means releasably fastening said tube to said in-feed slide; clamp adjustment means including spacer means selectively positioned to maintain the placement of the longitudinal axis of said tube for different tube diameters.

9. A tube end cutting machine comprising a circular cutting means; feed means adapted to feed the first end of a tube into engagement with said cutting means, whereby a radius is cut in said first end of an angle corresponding to the intersection of said cutting means and said first end; means adjusting the angular relationship between said cutting means and said feeding means to vary the angular intersection of said first end and said cutting means; said feed means being disposed in a first plane; said cutting means being disposed in a second plane; said feed means including an in-feed slide; means fastening a tube to said in-feed slide; actuating means moving said in-feed slide towards said cutting means; first adjusting means angularly positioning said in-feed slide about a first axis; said first adjustment means varying the intersection angle of said cutting means and said first tube end within said first plane; said actuating means constructed to automatically translate said in-feed slide a first predetermined distance; positioning means establishing a second predetermined distance between said first tube end and said cutting means prior to translation of said in-feed slide; said actuating means operatively related to said in-feed slide and said positioning means to provide a uniform depth of cut in successive ones of said tubes being cut; sensing means operatively connected to said in-feed slide, whereby the translation of said first predetermined distance engages said sensing means; said sensing means operatively connected to said actuating means, whereby the engagement of said sensing means reverses the movement of said in-feed slide to retract from said cutting means.

10. A tube end cutting machine comprising a milling machine head assembly fastened to a support assembly member, and having a cutting element disposed in a generally vertical plane; said member pivotally attached about a horizontal axis, adjustment means operatively connected thereto to angularly position said cutting element within said vertical plane; an in-feed table disposed in a generally horizontal plane; said in-feed table including an in-feed slide pivotally attached to said in-feed table about a vertical axis, another adjustment means operatively connected to angularly position said in-feed slide within said horizontal plane independent the positioning of the cutting element afforded by the first-mentioned adjustment means; means clamping a tube to said in-feed slide; translation of said in-feed slide presenting a first end of said tube to said cutting element; the angular position of said cutting element and said in-feed slide in said vertical and horizontal planes, respectively establishing the angle of intersection between said cutting element and said first tube end, whereby a simple or compound radii may be cut in said first tube end.

11. A tube end cutting machine comprising a milling machine head assembly fastened to a support assembly member, and having a cutting element disposed in a generally vertical plane; said member pivotally attached about a horizontal axis, and operatively connected thereto to angularly position said cutting element within said vertical plane; an in-feed table disposed in a generally horizontal plane; said in-feed table including an in-feed slide pivotally attached to said in-feed table about a vertical axis, and operatively connected to angularly position said in-feed slide within said horizontal plane; means clamping a tube to said in-feed slide; translation of said in-feed slide presenting a first end of said tube to said cutting element; the angular position of said cutting element and said-infeed slide in said vertical and horizontal planes, respectively establishing the angle of intersection between said cutting element and said first tube end, whereby a simple or compound radii may be cut in said first tube end; a second end of said tube operatively engaging a rear stop; said rear stop rotatively positioning said first tube end about the longitudinal axis of said tube in a predetermined angular relationship with respect to a radius cut in said second tube end; actuating means constructed to automatically translate said in-feed slide a first predetermined distance between said first tube end and said cutting means prior to translation of said in-feed slide; said actuating means operatively related to said in-feed slide and said positioning means to provide a uniform depth of cut in successive ones of said article being cut; said feed means including an in-feed slide; means fastening an article to said in-feed slide; actuating means moving said in-feed slide towards said cutting means; first adjusting means angularly positioning said in-feed slide about a first axis; said first adjustment means varying the intersection angle of said cutting means and an article within said first plane.

References Cited by the Examiner

UNITED STATES PATENTS

| 1,886,082 | 11/32 | Chapman | 77—62 |
| 3,004,477 | 10/61 | Nielsen et al. | 90—15 |
| 3,008,382 | 11/61 | Hawley et al. | 90—21 XR |

FOREIGN PATENTS

| 501,642 | 11/54 | Italy. |
| 590,109 | 3/59 | Italy. |

WILLIAM W. DYER, Jr., *Primary Examiner.*